US011558508B1

(12) United States Patent
Edamadaka

(10) Patent No.: US 11,558,508 B1
(45) Date of Patent: Jan. 17, 2023

(54) METHOD AND SYSTEM FOR REAL TIME REPORTING OF METRICS TO FUNGIBLE AGENTS IN OMNICHANNEL CONTACT CENTER

(71) Applicant: JPMorgan Chase Bank, N.A., New York, NY (US)

(72) Inventor: Rajeshwari Edamadaka, Allentown, NJ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 17/363,984

(22) Filed: Jun. 30, 2021

(51) Int. Cl.
*H04M 3/00* (2006.01)
*H04M 3/51* (2006.01)

(52) U.S. Cl.
CPC ....... *H04M 3/5175* (2013.01); *H04M 3/5183* (2013.01); *H04M 2203/401* (2013.01)

(58) Field of Classification Search
CPC ............. H04M 3/5175; H04M 3/5183; H04M 2203/401
USPC ....... 379/265.01–265.14, 266.01–266.1, 309
See application file for complete search history.

(56) References Cited

U.S. PATENT DOCUMENTS

| | | | |
|---|---|---|---|
| 11,089,162 B1 * | 8/2021 | Traba ................. | H04M 3/5175 |
| 2014/0192970 A1 * | 7/2014 | Castellani ........ | G06Q 10/06398 |
| | | | 379/265.06 |
| 2016/0079207 A1 * | 3/2016 | Yamaguchi ......... | H01L 25/0657 |
| | | | 257/738 |
| 2016/0125652 A1 * | 5/2016 | McCormack ........... | G06F 1/163 |
| | | | 345/633 |
| 2017/0111503 A1 * | 4/2017 | McGann ............. | H04M 3/5235 |
| 2018/0295211 A1 * | 10/2018 | Pirat ....................... | H04L 67/34 |
| 2019/0082052 A1 * | 3/2019 | Hardy .................... | G06F 9/453 |

OTHER PUBLICATIONS

International Search Report and Written Opinion in corresponding International Application No. PCT/US2022/030911, dated Jul. 11, 2022.

\* cited by examiner

*Primary Examiner* — William J Deane, Jr.
(74) *Attorney, Agent, or Firm* — Greenblum & Bernstein, P.L.C.

(57) ABSTRACT

A method and a system for reporting metrics relating to customer calls for fungible agents that are utilizing multiple servicing applications in a contact center environment are provided. The method includes: receiving a service request call from a customer; determining applications that are usable for responding to the service request call from among a predetermined plurality of applications; monitoring the service request call in order to obtain information relating to call timing and events occurring during the call; when the service request call is completed, determining call-specific metrics such as hold time, number of transfers, and or idle time based on the information obtained during the monitoring; and reporting the metrics to a repository. Additional metrics that are specific to an agent assigned to handle the call may also be determined.

20 Claims, 5 Drawing Sheets

METHOD AND SYSTEM FOR REAL TIME REPORTING OF METRICS TO FUNGIBLE AGENTS IN OMNICHANNEL CONTACT CENTER

BACKGROUND

1. Field of the Disclosure

This technology generally relates to methods and systems for reporting metrics relating to customer calls, and more particularly to methods and systems for reporting metrics relating to customer calls for fungible agents that are utilizing multiple servicing applications in a contact center environment.

2. Background Information

For a large corporate organization that has many customers, customer service is an important aspect of the business operation. Customers typically expect service requests to be handled in a timely and accurate manner, and if the corporate organization fails to provide such customer service, there may be a negative effect on the reputation of that organization.

Many customer service requests are performed online via the Internet. For such requests, the corporate organization may utilize a contact center that facilitates the provision of various servicing applications from different parts of the organization. However, because of the variety of applications and the scale of the overall operation, software developers may encounter difficulties in integrating newly developed applications with other parts of the software suite that serve the contact center.

Further, in the contact center, fungible agents will take calls from multiple line-of-business servicing applications and, within the same call, shift to service the customer for different servicing applications. When a specialist handles different servicing applications to assist the customer during the same call, it poses a challenge to track metrics regarding the specialist's average handle time, average talk time, etc. for a particular type of servicing application, which is one of many handled by the fungible specialist during the same call. By contrast, typical contact center reporting solutions rely on routing-related information in order to calculate agent and queue statistics; these traditional reporting solutions rely on only one type of servicing application being used to assist the customer which matches the type of call as identified by routing systems. When another type of servicing application is needed, the specialist transfers the customer to another virtual queue with differently skilled specialists. In order to reduce the number of transfers needed and elevate the customer experience, fungible contact center specialists are able to handle different types of servicing requests matching the intent of the customer's query and they can use more than one servicing application.

Accordingly, there is a need for methods and systems for reporting metrics relating to customer calls for fungible agents that are utilizing multiple servicing applications in a contact center environment.

SUMMARY

The present disclosure, through one or more of its various aspects, embodiments, and/or specific features or sub-components, provides, inter alia, various systems, servers, devices, methods, media, programs, and platforms for reporting metrics relating to customer calls for fungible agents that are utilizing multiple servicing applications in a contact center environment.

According to an aspect of the present disclosure, a method for reporting metrics relating to customer calls for fungible agents that are utilizing multiple servicing applications in a contact center environment is provided. The method is implemented by at least one processor. The method includes: receiving, by the at least one processor from a first customer, a service request call; determining, by the at least one processor, at least one application that is usable for responding to the service request call from among a predetermined plurality of applications; monitoring, by the at least one processor, the service request call in order to obtain information relating to a timing of the service request call, at least one event that occurs during the service request call, and at least one output of the at least one application; when the service request call is completed, determining, by the at least one processor, at least one call-specific metric based on the information obtained as a result of the monitoring; and reporting, by the at least one processor, each of the determined at least one call-specific metric to a predetermined destination.

The at least one call-specific metric may include at least one from among a hold time, a talk time, an average handle time, a call intent, a call disposition, a speed to answer, a number of calls abandoned, a number of calls dropped, a number of calls handled, an average after-call work time, a percentage of calls held, an average duration of calls held, an after-call work percentage of average handle time, a number and percentage of calls transferred, a number and percentage of calls conferenced, a combined percentage of transferred or conferenced calls, service level percentages, a number of transfers, an idle time, a call count, a type of servicing application used for each service request during the call per specialist segment and team leader, and a number of call recordings.

The at least one call-specific metric may further include intra-day summations of service levels, average handle times, an average speed to answer, a number of calls offered and a number of calls handled, summations and/or averages of metrics over a predetermined interval, such as, for example, 30 minutes, an eight-hour day, a week, or a month. Both per call and interval reporting have goals and thresholds which are also calculated and displayed to specialist and team leader in real time to monitor and take appropriate action.

The method may further include generating trends from such aggregation, which are subsequently used for work force management and forecasting.

The method may further include identifying an agent that is assigned to handle the service request call, and calculating at least one agent-specific metric based on the determined at least one call-specific metric and previously stored agent-specific metric data.

The method may further include capturing at least one metadata item that relates to the service request call. The at least one metadata item may include at least one from among telephony data, user profile data that relates to the identified agent, an identification of each of the at least one application, and information relating to whether the identified agent performed a search function during the service request call.

The method may further include displaying, on a display associated with the identified agent, a user interface that includes information relating to the service request call and information relating to a historical sequence of interactions that corresponds to the first customer.

The at least one application may include a first application that is usable for responding to a first aspect of the service request call and at least a second application that is usable for responding to a second aspect of the service request call.

The at least one call-specific metric may include a first call-specific metric that relates to the first aspect of the service request call and at least a second call-specific metric that relates to the second aspect of the service request call.

The method may further include using a container application that is designed to facilitate interactions between each of the predetermined plurality of applications for performing the monitoring and the reporting.

Additionally, the container application may show the customer journey in the same calls as the specialist-assisted customer with more than one application matching intent or query of customer together with disposition for each application, and tying it to the historical sequence of interactions for the customer's journey in fulfilling the customer intent.

The at least one call-specific metric may also include an amount of time spent and actions taken within the servicing application for business transactions. These metrics and other data that includes customer's devices, first time usage, etc., may be collected as part of click stream events, which may be sent to a post-analytical big data system with business insight visualization.

According to another exemplary embodiment, a computing apparatus for reporting metrics relating to customer calls is provided. The computing apparatus includes a processor; a memory; and a communication interface coupled to each of the processor and the memory. The processor is configured to: receive, from a first customer via the communication interface, a service request call; determine at least one application that is usable for responding to the service request call from among a predetermined plurality of applications; monitor the service request call in order to obtain information relating to a timing of the service request call, at least one event that occurs during the service request call, and at least one output of the at least one application; when the service request call is completed, determine at least one call-specific metric based on the information obtained as a result of the monitoring; and report each of the determined at least one call-specific metric to a predetermined destination.

The at least one call-specific metric may include at least one from among a hold time, a talk time, an average handle time, a call intent, a call disposition, a speed to answer, a number of calls abandoned, a number of calls dropped, a number of calls handled, an average after-call work time, a percentage of calls held, an average duration of calls held, an after-call work percentage of average handle time, a number and percentage of calls transferred, a number and percentage of calls conferenced, a combined percentage of transferred or conferenced calls, service level percentages, a number of transfers, an idle time, a call count, a type of servicing application used for each service request during the call per specialist segment and team leader, and a number of call recordings.

The processor may be further configured to identify an agent that is assigned to handle the service request call, and to calculate at least one agent-specific metric based on the determined at least one call-specific metric and previously stored agent-specific metric data.

The processor may be further configured to capture at least one metadata item that relates to the service request call. The at least one metadata item may include at least one from among telephony data, user profile data that relates to the identified agent, an identification of each of the at least one application, and information relating to whether the identified agent performed a search function during the service request call.

The processor may be further configured to display, on a display associated with the identified agent, a user interface that includes information relating to the service request call and information relating to a historical sequence of interactions that corresponds to the first customer.

The at least one application may include a first application that is usable for responding to a first aspect of the service request call and at least a second application that is usable for responding to a second aspect of the service request call.

The at least one call-specific metric may include a first call-specific metric that relates to the first aspect of the service request call and at least a second call-specific metric that relates to the second aspect of the service request call.

The processor may be further configured to use a container application that is designed to facilitate interactions between each of the predetermined plurality of applications for performing the monitoring and the reporting.

The container may pass the reporting metrics collected for each set of applications to contact center reporting systems and also attach this as metadata for identifying recordings, as well as for analytics, and use it as metadata to enrich the customer's experience when the customer is transferred or contacts the firm again.

According to yet another exemplary embodiment, a non-transitory computer readable storage medium storing instructions for reporting metrics relating to customer calls is provided. The storage medium includes executable code which, when executed by a processor, causes the processor to: receive, from a first customer, a service request call; determine at least one application that is usable for responding to the service request call from among a predetermined plurality of applications; monitor the service request call in order to obtain information relating to a timing of the service request call, at least one event that occurs during the service request call, and at least one output of the at least one application; when the service request call is completed, determine at least one call-specific metric based on a result of the monitoring; and report each of the determined at least one call-specific metric to a predetermined destination.

The executable code may be further configured to cause the processor to identify an agent that is assigned to handle the service request call, and to calculate at least one agent-specific metric based on the determined at least one call-specific metric and previously stored agent-specific metric data.

The executable code may be further configured to cause the processor to display, on a display associated with the identified agent, a user interface that includes information relating to the service request call and information relating to a historical sequence of interactions that corresponds to the first customer.

The at least one application may include a first application that is usable for responding to a first aspect of the service request call and at least a second application that is usable for responding to a second aspect of the service request call.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
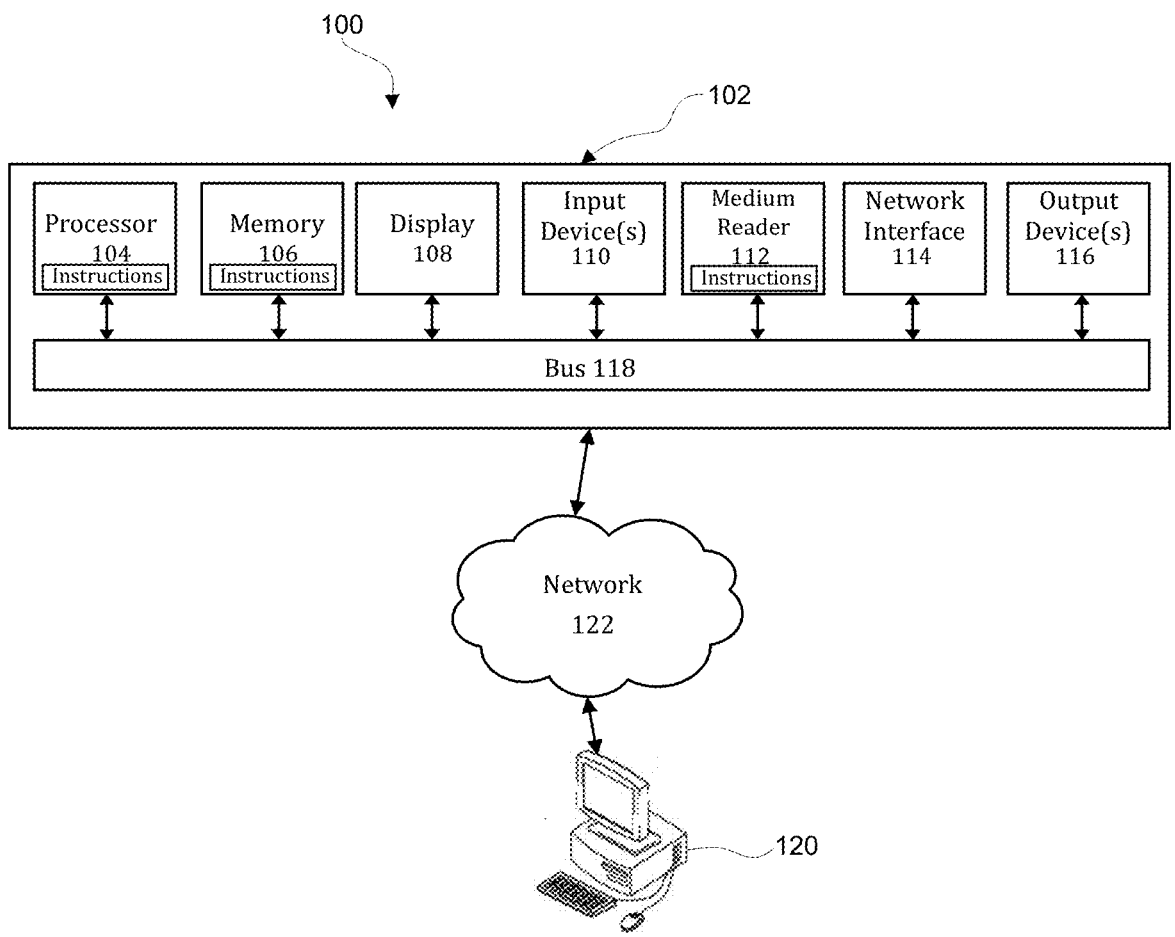
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data as well as executable instructions and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As illustrated in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is illustrated in FIG. 1 as a wireless network, those skilled in the art appreciate that the network 122 may also be a wired network.

The additional computer device 120 is illustrated in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for reporting metrics relating to customer calls for fungible agents that are utilizing multiple servicing applications in a contact center environment.

Figure 2:
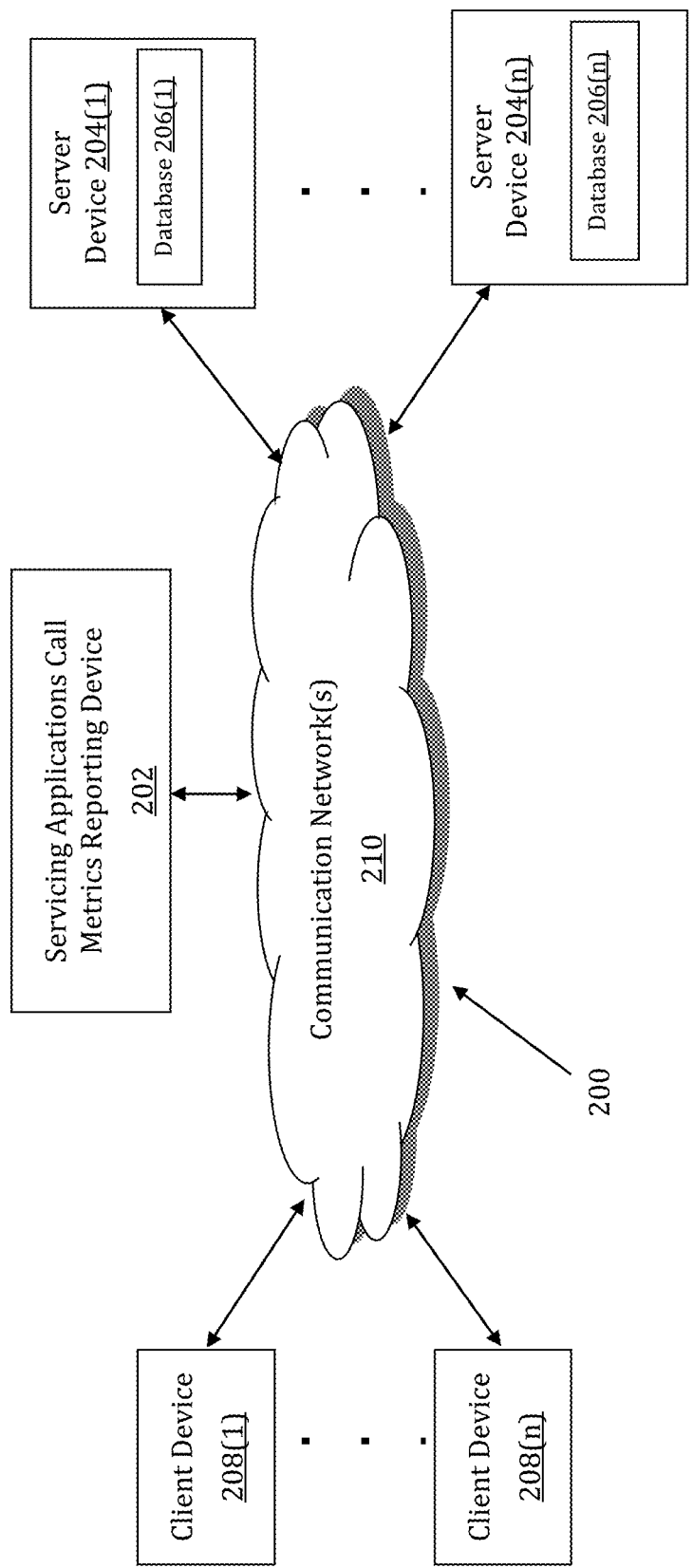
FIG. 2 illustrates an exemplary diagram of a network environment.

Referring to FIG. 2, a schematic of an exemplary network environment 200 for implementing a method for reporting metrics relating to customer calls for fungible agents that are utilizing multiple servicing applications in a contact center environment is illustrated. In an exemplary embodiment, the method is executable on any networked computer platform, such as, for example, a personal computer (PC).

The method for reporting metrics relating to customer calls for fungible agents that are utilizing multiple servicing applications in a contact center environment may be implemented by a Servicing Applications Call Metrics Reporting (SACMR) device 202. The SACMR device 202 may be the same or similar to the computer system 102 as described with respect to FIG. 1. The SACMR device 202 may store one or more applications that can include executable instructions that, when executed by the SACMR device 202, cause the SACMR device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the SACMR device 202 itself, may be located in virtual server(s) running in a cloud-based computing environment rather than being tied to one or more specific physical network computing devices. Also, the application(s) may be running in one or more virtual machines (VMs) executing on the SACMR device 202. Additionally, in one or more embodiments of this technology, virtual machine(s) running on the SACMR device 202 may be managed or supervised by a hypervisor.

In the network environment 200 of FIG. 2, the SACMR device 202 is coupled to a plurality of server devices 204(1)-204(n) that hosts a plurality of databases 206(1)-206(n), and also to a plurality of client devices 208(1)-208(n) via communication network(s) 210. A communication interface of the SACMR device 202, such as the network interface 114 of the computer system 102 of FIG. 1, operatively couples and communicates between the SACMR device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the SACMR device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and SACMR devices that efficiently implement a method for reporting metrics relating to customer calls for fungible agents that are utilizing multiple servicing applications in a contact center environment.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The SACMR device 202 may be a standalone device or integrated with one or more other devices or apparatuses, such as one or more of the server devices 204(1)-204(n), for example. In one particular example, the SACMR device 202 may include or be hosted by one of the server devices 204(1)-204(n), and other arrangements are also possible. Moreover, one or more of the devices of the SACMR device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the SACMR device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to agent-specific call servicing metrics and customer-specific call servicing.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the SACMR device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the SACMR device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the SACMR device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the SACMR device 202, the server devices 204(1)-204(n), or the client devices 208(1)-

208(n), for example, may be configured to operate as virtual instances on the same physical machine. In other words, one or more of the SACMR device 202, the server devices 204(1)-204(n), or the client devices 208(1)-208(n) may operate on the same physical device rather than as separate devices communicating through communication network(s) 210. Additionally, there may be more or fewer SACMR devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
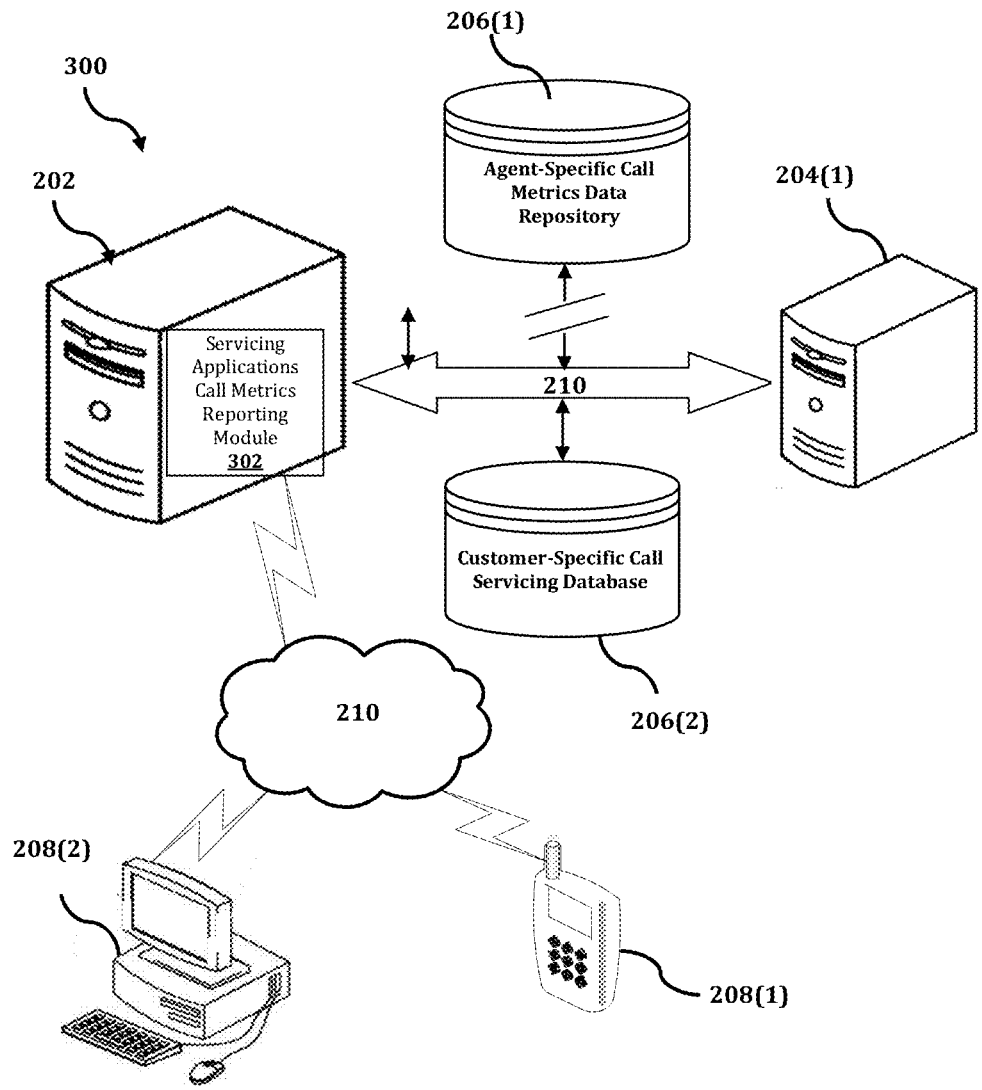
FIG. 3 shows an exemplary system for implementing a method for reporting metrics relating to customer calls for fungible agents that are utilizing multiple servicing applications in a contact center environment.

The SACMR device 202 is described and illustrated in FIG. 3 as including a servicing applications call metrics reporting module 302, although it may include other rules, policies, modules, databases, or applications, for example. As will be described below, the contact center servicing fabric container module 302 is configured to implement a method for reporting metrics relating to customer calls for fungible agents that are utilizing multiple servicing applications in a contact center environment.

An exemplary process 300 for implementing a mechanism for reporting metrics relating to customer calls for fungible agents that are utilizing multiple servicing applications in a contact center environment by using the network environment of FIG. 2 is illustrated as being executed in FIG. 3. Specifically, a first client device 208(1) and a second client device 208(2) are illustrated as being in communication with SACMR device 202. In this regard, the first client device 208(1) and the second client device 208(2) may be "clients" of the SACMR device 202 and are described herein as such. Nevertheless, it is to be known and understood that the first client device 208(1) and/or the second client device 208(2) need not necessarily be "clients" of the SACMR device 202, or any entity described in association therewith herein. Any additional or alternative relationship may exist between either or both of the first client device 208(1) and the second client device 208(2) and the SACMR device 202, or no relationship may exist.

Further, SACMR device 202 is illustrated as being able to access an agent-specific call metrics data repository 206(1) and a customer-specific call servicing database 206(2). The servicing applications call metrics reporting module 302 may be configured to access these databases for implementing a method for reporting metrics relating to customer calls for fungible agents that are utilizing multiple servicing applications in a contact center environment.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the SACMR device 202 via broadband or cellular communication. Of course, these embodiments are merely exemplary and are not limiting or exhaustive.

Upon being started, the servicing applications call metrics reporting module 302 executes a process for reporting metrics relating to customer calls for fungible agents that are utilizing multiple servicing applications in a contact center environment. An exemplary process for reporting metrics relating to customer calls for fungible agents that are utilizing multiple servicing applications in a contact center environment is generally indicated at flowchart 400 in FIG. 4.

Figure 4:
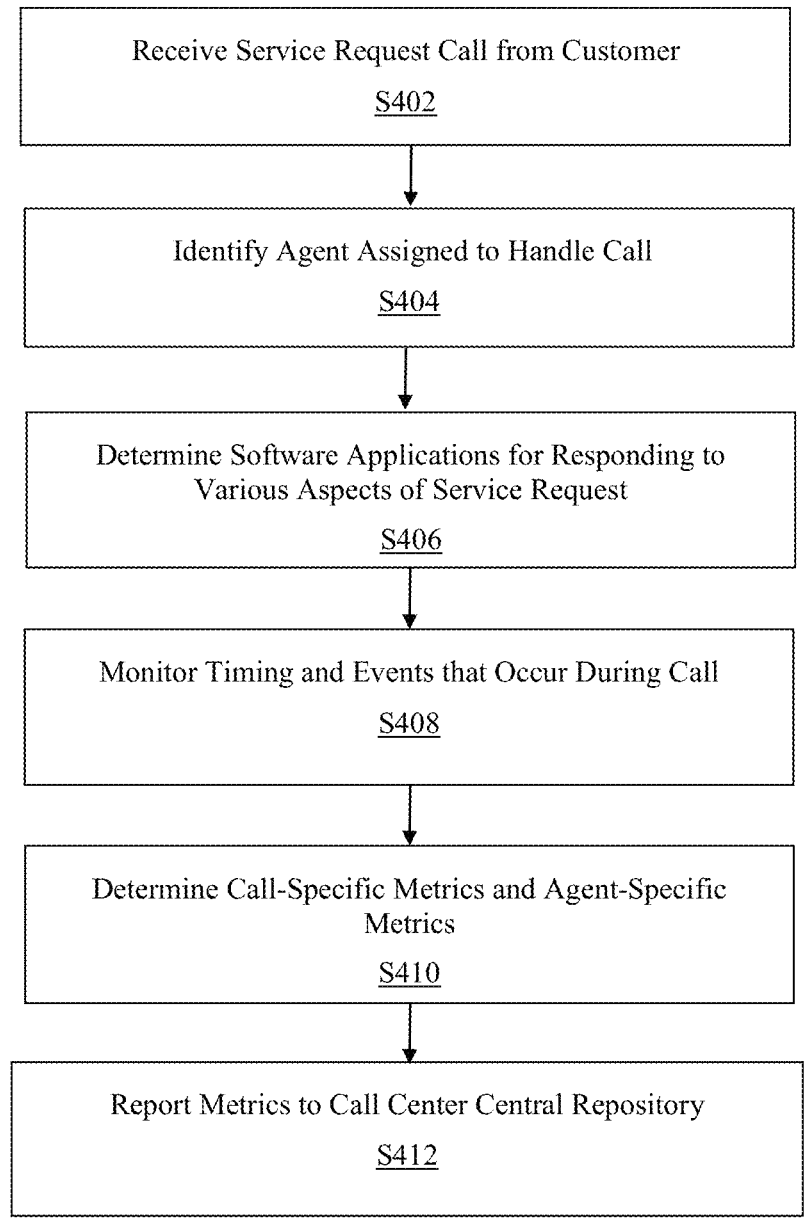
FIG. 4 is a flowchart of an exemplary process for implementing a method for reporting metrics relating to customer calls for fungible agents that are utilizing multiple servicing applications in a contact center environment.

In process 400 of FIG. 4, at step S402, the servicing applications call metrics reporting module 302 receives a service request call from a customer. At step S404, the call is assigned to an agent, and the servicing applications call metrics reporting module 302 determines an identification of the agent. In an exemplary embodiment, the servicing applications call metrics reporting module 302 may display a user interface at a workstation associated with the agent, and may include information relating to the call and the customer, such as, for example, information relating to a historical sequence of interactions with the customer. Such information is often referred to as a "customer journey."

At step S406, the servicing applications call metrics reporting module 302 determines which available software applications would be useful for responding to various aspects of the customer's service request. In an exemplary embodiment, a contact center may use a container application that is configured to facilitate interactions among a large number of applications that are used for various functions that are designed to address customer service inquiries. In this regard, the servicing applications call metrics reporting module 302 may select one or more of the applications that are integrated into the container application for addressing the specific service request presented by the customer. Alternatively, the agent handling the call may simply select which applications would be most helpful. Importantly, in many circumstances, a customer service request call may raise multiple requests and/or may include several aspects that would best be addressed by using different applications.

At step S408, the servicing applications call metrics reporting module 302 monitors the call. In an exemplary embodiment, the call is monitored with respect to timing, events, and outputs of the applications being used to address each separate aspect of the service request. For example, a beginning time and an ending time of the call may be recorded, and any other timing-related aspects such as hold time and/or idle time may be recorded. As another example, if a customer is transferred from a first agent to a second agent, this event may be recorded. Other events and/or application outputs may vary widely based on the particulars of the service request.

At step S410, the servicing applications call metrics reporting module 302 determines a set of metrics relating to the customer service request call. The metrics may include call-specific metrics, such as, for example, a hold time, an idle time, a number of transfers, a call count, and/or call recordings. The metrics may also include agent-specific metrics that are calculable with reference to previously stored agent-specific data. For example, an agent-specific average hold time (AHT) may be calculated by combining previously stored agent-specific AHT data with a hold time for the current call, as determined in step S408. In an exemplary embodiment, the metrics may also include metadata items relating to the service request call, such as, for example, telephony data, user profile data relating to the agent, identifications of which applications were used for responding to the service request, and whether or not a search function was performed during the call.

At step S412, the servicing applications call metrics reporting module 302 reports the metrics to a call center central repository, such that all interested parties within the call center environment may access the metrics. In an exemplary embodiment, the container application may be utilized for routing the metrics to appropriate destinations.

Figure 5:
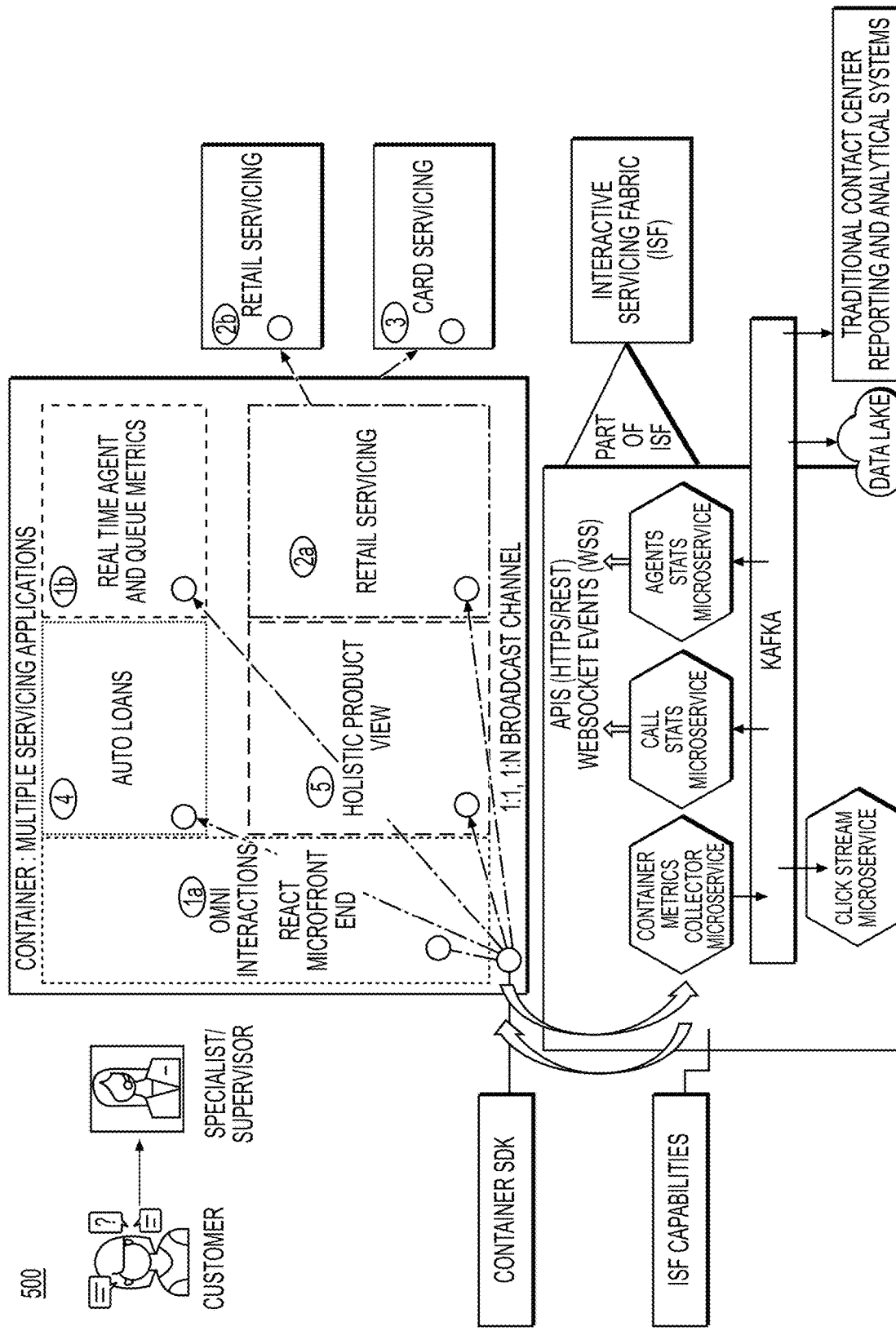
FIG. 5 is an architecture diagram of a system for implementing a method for reporting metrics relating to customer calls for fungible agents that are utilizing multiple servicing applications in a contact center environment, according to an exemplary embodiment.

FIG. 5 is an architecture diagram 500 of a system for implementing a method for reporting metrics relating to customer calls for fungible agents that are utilizing multiple servicing applications in a contact center environment, according to an exemplary embodiment. As illustrated in architecture diagram 500, an interaction servicing fabric (ISF) container technology archetype enables fungible reporting through a container, which includes multiple servicing applications.

In an exemplary embodiment, during the same call (1a), a specialist assists a customer with multiple servicing applications, also referred to herein as microfront ends, including: (2a) and (2b) retail accounts; (3) credit card inquiries; and (4) automobile loan related requests. The metrics are continuously updated in (1b). The different products may be launched through hot links from one microfront end to another, or with (5) a holistic view microfront end. The container monitors the activity in each microfront end and sends the raw data to the ISF over web sockets. The Web Socket Notification carries servicing application events from the container to the ISF, and communicates calculated metrics from the ISF to the container.

Metrics for each service application used during the call may include any one or more of the following: hold time, talk time, average handle time, call intent, call disposition, speed to answer, number of calls abandoned, number of calls dropped, number of calls handled, average after-call work time, percentage of calls held, average duration of calls held, after-call work percentage of average handle time, number and percentage of calls transferred, number and percentage of calls conferenced, combined percentage of transferred or conferenced calls, service level percentages, a number of transfers, an idle time, a call count, a type of servicing application used for each service request during the call per specialist segment and team leader, and a number of call recordings.

Interval reporting: This may include any one or more of the following: Intra-day summations of service levels, average handle times, average speed to answer, number of calls offered and number of calls handled summations/averages of metrics over an interval, such as, for example, 30 minutes or 8 hours, one week, or one month, with goals and thresholds which are also calculated and displayed to the specialist and the team leader in real time in order to facilitate monitoring and taking appropriate action.

Trends: ISF can generate trends from such aggregation, which is subsequently used for work force management and forecasting.

Interfaces to other systems—Data Lakes, Traditional Reporting Systems, and Analytic Systems: The metrics data and click stream data (i.e., user first time visit, type of device, operating system, time spent, business transaction details, time spent on each click following click stream architecture) is sent to a data lake for historical analytics, business insights, quality, and dashboarding, and also sent to traditional contact center reporting systems. Customer journey visualization can also be drawn through a combination of current call and historical interactions.

Accordingly, with this technology, an optimized process for reporting metrics relating to customer calls for fungible agents that are utilizing multiple servicing applications in a contact center environment is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims, and their equivalents, and shall not be restricted or limited by the foregoing detailed description.

What is claimed is:

1. A method for reporting metrics relating to customer calls, the method being implemented by at least one processor, the method comprising:
    receiving, by the at least one processor and from a first customer, a service request call;
    assigning, by the at least one processor, a single customer service agent to handle the service request call sent by the first customer;
    determining, by the at least one processor, a plurality of software applications that are to be used by the single customer service agent for responding to the service request call, the service request call including a plurality of requests of different types, wherein the plurality of software applications addresses the plurality of requests included in the service request call;
    monitoring, by the at least one processor, the service request call in order to obtain information relating to a timing of the service request call, events that occur during the service request call, and at least one output of the plurality of software applications;
    when the service request call is completed, determining, by the at least one processor and for each of the plurality of software applications used by the single customer service agent during servicing the first customer during the service request call, at least one call-specific metric for a respective software application based on the information obtained as a result of the monitoring; and
    reporting, by the at least one processor and for each of the plurality of software applications used by the single customer service agent during the servicing of the first customer during the service request call, the determined at least one call-specific metric to a central repository.

2. The method of claim 1, wherein the at least one call-specific metric includes at least one from among a hold time, a talk time, an average handling time, a call intent, a call disposition, a speed to answer, a number of calls abandoned, a number of calls dropped, a number of calls handled, an average after-call work time, a percentage of calls held, an average duration of calls held, an after-call work percentage of average time, a number and percentage of calls transferred, a number and percentage of calls conferenced, a combined percentage of transferred or conferenced calls, service level percentages, a number of transfers, an idle time, a call count, a type of servicing software application used for each service request during the call per specialist segment and team leader, and a number of call recordings.

3. The method of claim 1, further comprising identifying the customer service agent that is assigned to handle the service request call, and calculating at least one agent-specific metric based on the determined at least one call-specific metric and previously stored agent-specific metric data.

4. The method of claim 3, further comprising capturing at least one metadata item that relates to the service request call,
    wherein the at least one metadata item includes at least one from among telephony data, user profile data that relates to the identified agent, an identification of each of the plurality of software applications used by the single customer service agent, and information relating to whether the identified agent performed a search function during the service request call.

5. The method of claim 3, further comprising displaying, on a display associated with the identified customer service agent, a user interface that includes information relating to the service request call and information relating to a historical sequence of interactions that corresponds to the first customer.

6. The method of claim 1, wherein the plurality of software applications includes a first software application that is usable for responding to a first aspect of the service request call and at least a second software application that is usable for responding to a second aspect of the service request call.

7. The method of claim 6, wherein the at least one call-specific metric includes a first call-specific metric that relates to the first aspect of the service request call and at least a second call-specific metric that relates to the second aspect of the service request call.

8. The method of claim 1, further comprising using a container software application that is designed to facilitate interactions between each of the plurality of software applications for performing the monitoring and the reporting.

9. A computing apparatus for reporting metrics relating to customer calls, the computing apparatus comprising:
   a processor;
   a memory; and
   a communication interface coupled to each of the processor and the memory,
   wherein the processor is configured to:
      receive, from a first customer via the communication interface, a service request call;
      assign a single customer service agent to handle the service request call sent by the first customer;
      determine a plurality of software applications that are to be used by the single customer service agent for responding to the service request call, the service request call including a plurality of requests of different types, wherein the plurality of software applications addresses the plurality of requests included in the service request call;
      monitor the service request call in order to obtain information relating to a timing of the service request call, events that occur during the service request call, and at least one output of the plurality of software applications;
      when the service request call is completed, determine for each of the plurality of software applications used by the single customer service agent during servicing the first customer during the service request call, at least one call-specific metric for a respective software application based on the information obtained as a result of the monitoring; and
      for each of the plurality of software applications used by the single customer service agent during the servicing of the first customer during the service request call, report the determined at least one call-specific metric to a central repository.

10. The computing apparatus of claim 9, wherein the at least one call-specific metric includes at least one from among a hold time, a talk time, an average handling time, a call intent, a call disposition, a speed to answer, a number of calls abandoned, a number of calls dropped, a number of calls handled, an average after-call work time, a percentage of calls held, an average duration of calls held, an after-call work percentage of average time, a number and percentage of calls transferred, a number and percentage of calls conferenced, a combined percentage of transferred or conferenced calls, service level percentages, a number of transfers, an idle time, a call count, a type of servicing software application used for each service request during the call per specialist segment and team leader, and a number of call recordings.

11. The computing apparatus of claim 9, wherein the processor is further configured to identify the customer service agent that is assigned to handle the service request call, and to calculate at least one agent-specific metric based on the determined at least one call-specific metric and previously stored agent-specific metric data.

12. The computing apparatus of claim 11, wherein the processor is further configured to capture at least one metadata item that relates to the service request call, and wherein the at least one metadata item includes at least one from among telephony data, user profile data that relates to the identified agent, an identification of each of the plurality of software applications used by the single customer service agent, and information relating to whether the identified agent performed a search function during the service request call.

13. The computing apparatus of claim 11, wherein the processor is further configured to display, on a display associated with the identified customer service agent, a user interface that includes information relating to the service request call and information relating to a historical sequence of interactions that corresponds to the first customer.

14. The computing apparatus of claim 9, wherein the plurality of software applications includes a first software application that is usable for responding to a first aspect of the service request call and at least a second software application that is usable for responding to a second aspect of the service request call.

15. The computing apparatus of claim 14, wherein the at least one call-specific metric includes a first call-specific metric that relates to the first aspect of the service request call and at least a second call-specific metric that relates to the second aspect of the service request call.

16. The computing apparatus of claim 9, wherein the processor is further configured to use a container software application that is designed to facilitate interactions between each of the plurality of software applications for performing the monitoring and the reporting.

17. A non-transitory computer readable storage medium storing instructions for reporting metrics relating to customer calls, the storage medium comprising executable code which, when executed by a processor, causes the processor to:
   receive, from a first customer, a service request call;
   assign a single customer service agent to handle the service request call sent by the first customer;
   determine a plurality of software applications that are to be used by the single customer service agent for responding to the service request call, the service request call including a plurality of requests of different types, wherein the plurality of software applications addresses the plurality of requests included in the service request call;
   monitor the service request call in order to obtain information relating to a timing of the service request call, events that occur during the service request call, and at least one output of the plurality of software applications;
   when the service request call is completed, for each of the plurality of software applications used by the single customer service agent during servicing the first customer during the service request call, determine at least one call-specific metric for a respective software application based on a result of the monitoring; and
   for each of the plurality of software applications used by the single customer service agent during the servicing of the first customer during the service request call, report the determined at least one call-specific metric to a central repository.

18. The storage medium of claim 17, wherein the executable code is further configured to cause the processor to identify the customer service agent that is assigned to handle the service request call, and to calculate at least one agent-specific metric based on the determined at least one call-specific metric and previously stored agent-specific metric data.

19. The storage medium of claim 18, wherein the executable code is further configured to cause the processor to display, on a display associated with the identified customer service agent, a user interface that includes information relating to the service request call and information relating to a historical sequence of interactions that corresponds to the first customer.

20. The storage medium of claim 17, wherein the plurality of software applications includes a first software application that is usable for responding to a first aspect of the service request call and at least a second software application that is usable for responding to a second aspect of the service request call.

* * * * *